United States Patent [19]
Je et al.

[11] Patent Number: 5,553,834
[45] Date of Patent: Sep. 10, 1996

[54] LATERAL AND AXIAL VIBRATION ISOLATORS UTILIZING LEAF SPRINGS

[75] Inventors: Yang-Gyu Je, Daejeon-si; Jong-Su Kim, Basan-Si, both of Rep. of Korea

[73] Assignee: Korea Institute of Machinery and Metals, Daejeon-Si, Rep. of Korea

[21] Appl. No.: 338,190

[22] Filed: Nov. 9, 1994

[30] Foreign Application Priority Data

Nov. 12, 1993 [KR] Rep. of Korea ............ 93-24034
Jan. 18, 1994 [KR] Rep. of Korea ............ 94-835

[51] Int. Cl.⁶ .................................................. F16F 9/14
[52] U.S. Cl. ........................................ 267/140.12; 188/307
[58] Field of Search ........................... 188/307, 286; 267/146.11, 140.12, 140.13, 31.32, 151, 169, 162, 281, 283, 284, 282, 158

[56] References Cited

U.S. PATENT DOCUMENTS

| | | | |
|---|---|---|---|
| 1,843,682 | 2/1932 | Kinnear | 188/307 |
| 2,573,119 | 10/1951 | Torres | 267/31 |
| 2,600,090 | 6/1952 | Barber et al. | 267/140.13 |
| 4,817,926 | 4/1989 | Schwerdt | 267/140.12 |
| 4,838,529 | 6/1989 | Orikawa et al. | 267/140.12 |
| 5,005,810 | 4/1991 | Sawada et al. | 267/140.12 |
| 5,024,425 | 6/1991 | Schwerdt | 267/140.12 |
| 5,050,850 | 9/1991 | Noguchi et al. | 267/140.12 |
| 5,064,176 | 11/1991 | Goto | 267/140.11 |

FOREIGN PATENT DOCUMENTS 678486 3/1930 France ............ 188/307

*Primary Examiner*—Matthew C. Graham
*Attorney, Agent, or Firm*—Armstrong, Westerman, Hattori, McLeland & Naughton

[57] ABSTRACT

A vibration isolator for lateral and axial isolation, as the case may be, of vibrations between inner and outer elements, such elements having a space therebetween with leaf spring packs and hydraulic fluid therein and hydraulic fluid passages for moving hydraulic fluid opposite sides of such leaf spring packs for dampening vibration between such elements.

8 Claims, 4 Drawing Sheets

LATERAL AND AXIAL VIBRATION ISOLATORS UTILIZING LEAF SPRINGS

BACKGROUND OF THE INVENTION

1. Field of the Invention

This invention relates to a vibration isolator and, more particularly, to lateral or axial vibration isolators in which leaf springs are employed to isolate vibration in rotating machinery shafts and mounts for supporting structures.

2. Description of the Prior Art

Because it is possible to standardize and mass-produce rolling element bearings, such bearings are cost effective and widely used in industry. Such rolling element bearings, however, have little damping force. Thus, to provide adequate damping force, squeeze film dampers are employed to add necessary additional dampening force. Such squeeze film dampers conventionally consist of outer and inner circular elements with the thin fluid film therebetween. However, unlike journal bearings, the inner circular element does not rotate. Thus, squeeze film dampers require an oil circulating system because of heat generation in the thin-fluid film. Such oil circulating system requires oil feeding, oil extracting and filtering systems. Hence, it is difficult to standardize and mass-produce squeeze film dampers and their installation is not easy.

In axial vibration isolators, such as, for example, large engines, building air conditioning units, printing presses, bridges and other large applications, rubber isolators, which are relatively inexpensive, have been widely used as resilient mounts. Such rubber isolators, however, when used in high temperature environments for long periods of time lose resilience and, thereby, static and dynamic characteristics are changed. Because the stiffness of rubber is smaller than that of steel, rubber vibration isolators are not appropriate for high load carrying applications.

SUMMARY OF THE INVENTION

In the instant invention leaf spring vibration isolators are provided for lateral and axial vibration dampening and which overcome the problem of conventional isolators, such as, squeeze film dampers, rubber isolators and the like. With such leaf spring isolators of the present invention, stiffness and dampening force are easily controlled. Auxiliary parts and systems are not required. Such leaf spring isolators can be standardized and mass produced. Such leaf spring isolators can be used where high load carrying capacity is required and where operation, at high temperature, is necessary and can be employed in rotating and non-rotating structures, such as pipe systems of power and chemical plants.

BRIEF DESCRIPTION OF THE DRAWINGS

The instant invention will be better understood when taken with the appended drawings in which.

DETAILED DESCRIPTION OF THE PREFERRED EMBODIMENTS

Figure 2:
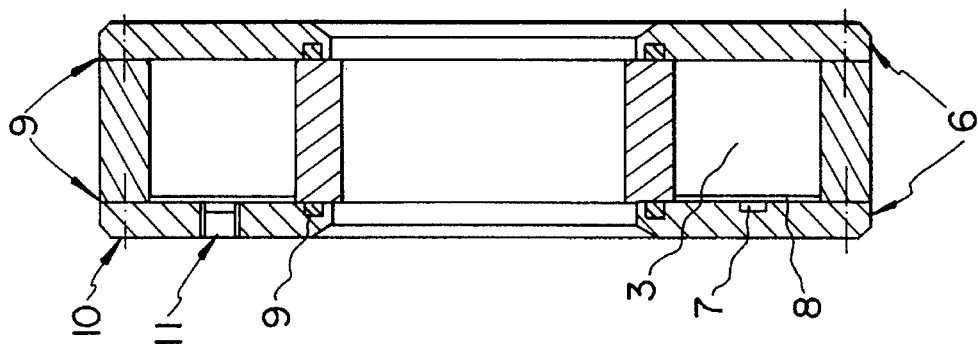
FIG. 2 is a sectional transverse view of the isolator of FIG. 1.
Figure 1:
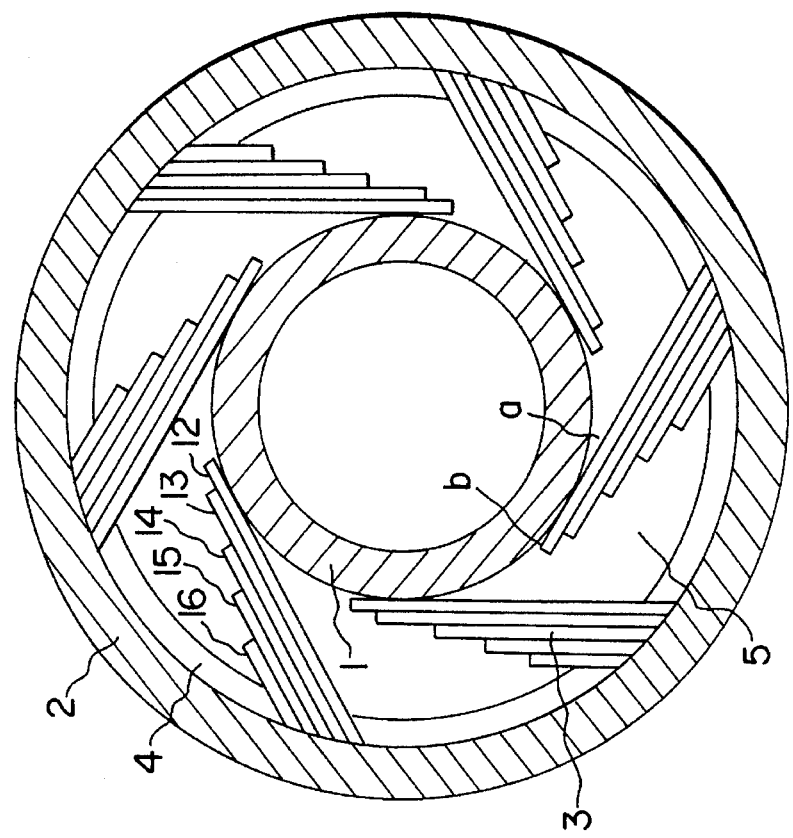
FIG. 1 is a sectional side view of the leaf spring vibration isolator as applied to a rotating shaft.
Figure 3:
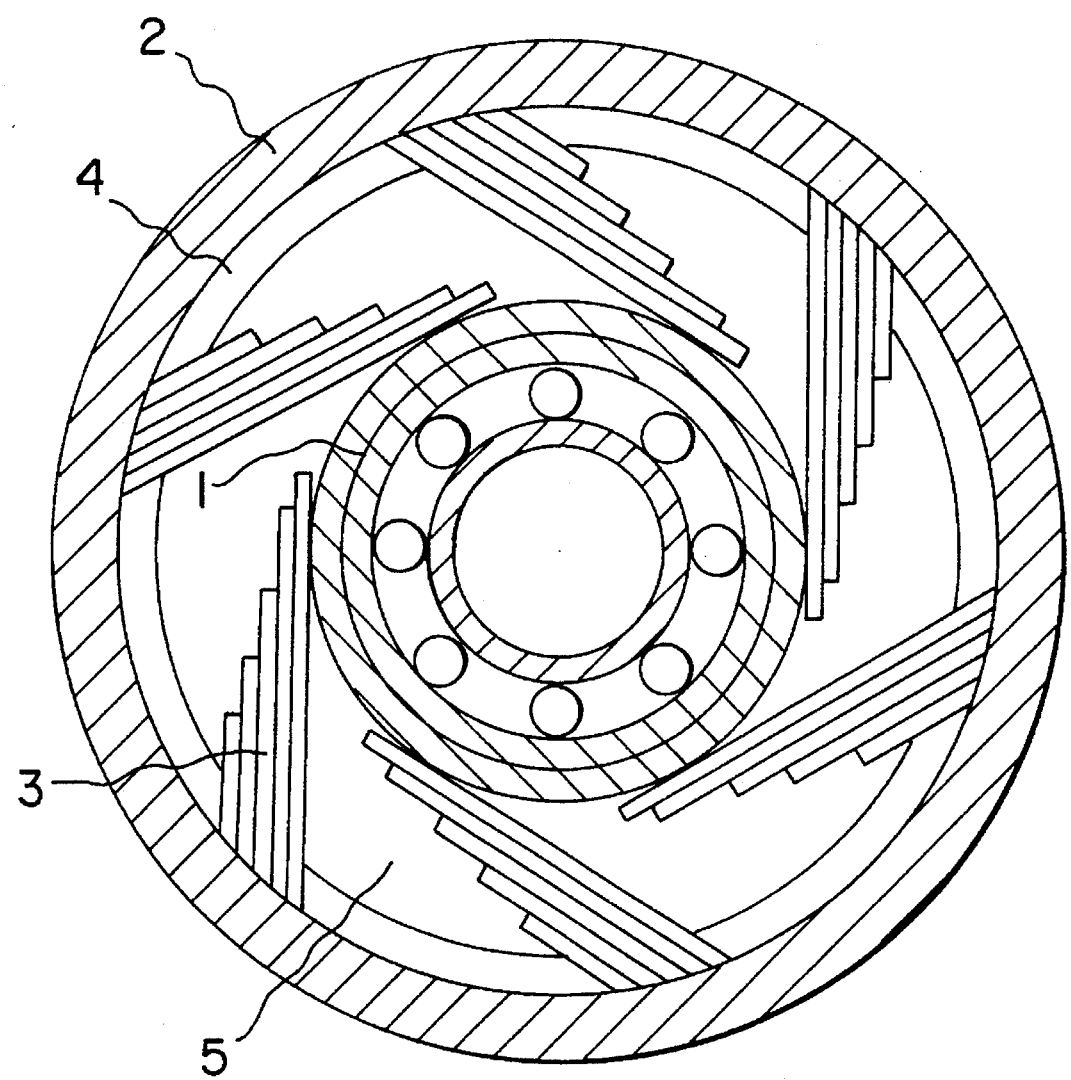
FIG. 3 is a sectional side view of the leaf spring vibration isolator of FIG. 1 as applied to a rotating shaft with a ball bearing mounting.
Figure 4:
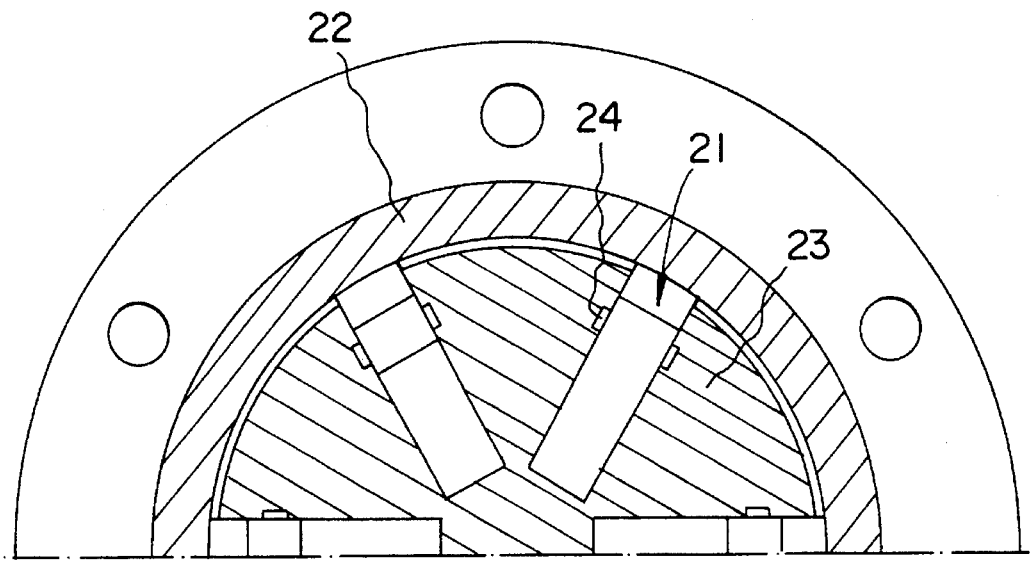
FIG. 4 is a top view, partly in section, of the leaf spring vibration isolator as applied as an axial vibration isolator.

As shown in the embodiments of FIGS. 1, 2 and 3, the lateral vibration isolator consists of leaf spring packs 3 between inner and out rings 1 and 2 with hydraulic fluid in the spaces 5 therebetween. The inner ring 1 is elastically supported by the leaf spring packs 3 circumferentially installed between inner ring 1 and outer ring 2. The supporting force is determined by the number, geometry (i.e., thickness, width and length) and material of the leaf springs, and by the number of the leaf spring packs. Thus, as shown in FIGS. 1 and 3, each of the leaf spring packs is made up of a plurality of leaf springs 12, 13, 14, 15 and 16 stacked, one on the other, with the inner ends of the leaf springs free and the opposite ends of the leaf springs shaped to meet the contour of the inner surface of the outer ring 2. Innermost leaf spring 12 of each leaf spring pack is in sliding tangential contact with the outer surface of inner ring 1. Since its elastic supporting force is controllable, the critical speeds of a machine mounted on the invented vibration isolator can be readily controllable. When the critical speeds are controllable, machine stability can be enhanced by moving the critical speeds away from the operating speed.

Relative motion of the inner ring 1, FIGS. 1 and 3, results in a volume change of the inner fluid space 5, and the fluid flows through fluid passages formed by the groove 7 and oil gap 8, FIG. 2, from one side of each leaf spring pack to the other thus generating the damping force. The damping force can be controlled by the fluid viscosity, friction coefficient, and groove size. With the invented lateral vibration isolators, the stiffness and damping force at the supporting position are easily controlled and large damping forces can be obtained. Theoretical analysis results show that the damping force of the invented isolator is equal to or greater than those of squeeze film dampers and fluid film bearings and also shows that there is no cross couple terms of stiffness and damping forces in the perpendicular directions. Stable dynamic characteristics of the isolator of the instant invention are, thus, achieved.

As shown in FIG. 2, the inner fluid space is sealed by covers 6 and sealing elements 9 forming, with inner and outer rings 1 and 2, a sealed chamber. Hydraulic fluid is supplied to fluid spaces 5 through feeding hole 11, making an extra oil circulating system unnecessary. Therefore, the standardization and mass-production of the invented isolator is possible.

As shown in FIG. 3, the inner ring 1 may be provided with a rolling element bearing 20 or may utilize a fluid film bearing. When the inner ring or shaft 1 of FIG. 1 starts to rotate, the hydrodynamic pressure generated between the inner ring 1 and leaf springs packs 3 and the resulting lubricating fluid film separates them from each other. The bearing which utilizes both the lubricating fluid film and leaf springs, as shown in FIG. 3, has a rich damping force and good vibration characteristics. The oil swirl, which is a typical unstable mode in certain fluid film bearings, does not occur in such isolator.

Figure 5:
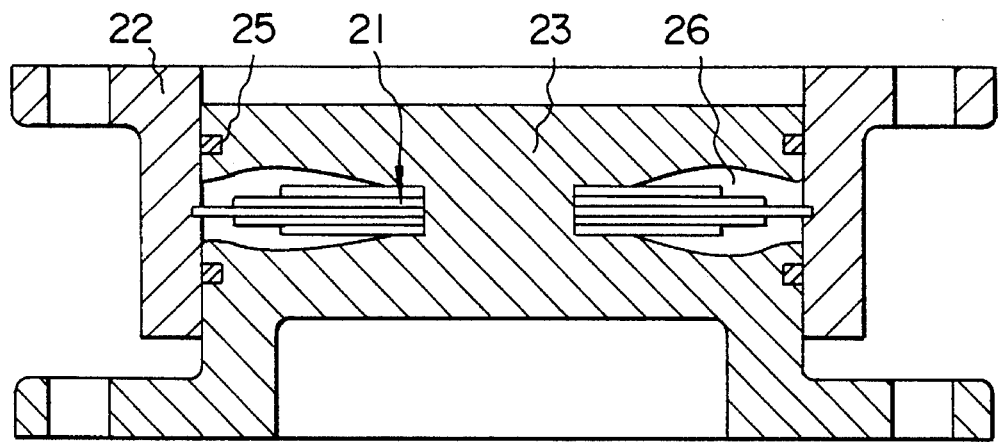
FIG. 5 is a sectional side view of the isolator of FIG. 4.
Figure 6:
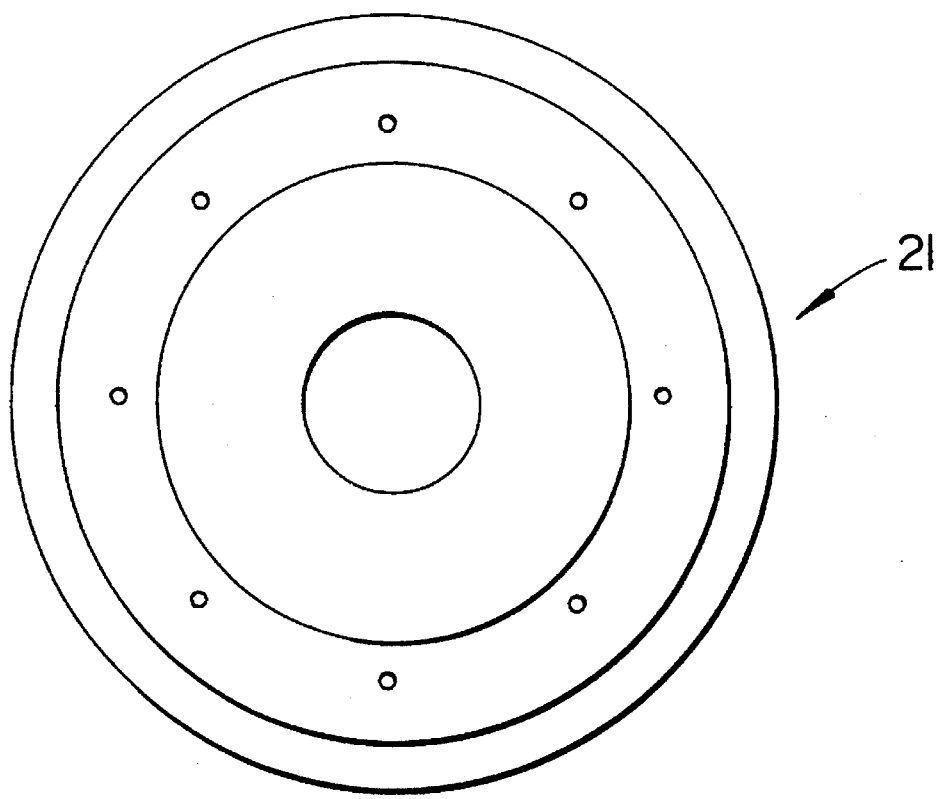
FIG. 6 is a view of the leaf spring isolator employed in the apparatus of FIG. 5.
Figure 7:
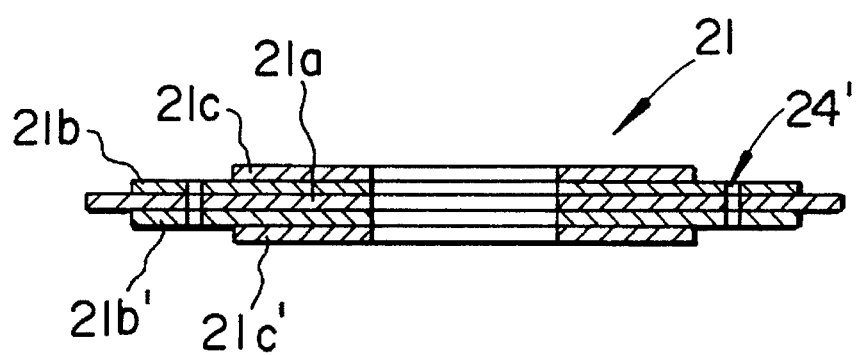
FIG. 7 is a sectional side view of the leaf spring isolator of FIG. 6.

As shown in the embodiments of FIGS. 4, 5, 6 and 7, the axial vibration isolator consists of leaf springs packs 21 between an outer axially movable element 22 and an inner element 23 with hydraulic fluid and leaf spring packs 21 in the spaces 26 therebetween. The outer movable element 22 is elastically supported by leaf springs packs 21 radially installed between outer element 22 and inner stationary element 23. The supporting force is determined by the number, geometry (i.e., thickness, width, and length), and material of leaf springs, and by the number of leaf spring packs. As shown in FIGS. 5 and 7, each of the leaf spring packs 21 is made up of a plurality of leaf springs 21b, 21b', 21c and 21c' stacked on opposite sides of center leaf spring 21a, with the ends of leaf springs 21b, 21b' and 21c, 21c' aligned at the inner end of spring packs 21 and progressively shorter in length at the outer ends.

As shown in FIG. 5, the inner fluid spaces 26 are separated into the upper and lower spaces by the leaf spring packs 21. Oil flows between the spaces 26 located at opposite sides of the leaf spring packs 21 through orifices 24' extending through the leaf springs. Relative motion between the outer moving element 22 and the inner stationary element 23 results in a volume change of the inner fluid space 26. When the volume of space 26 changes, a pressure difference occurs across the upper and lower spaces. This pressure difference generates oil flow and thereby, the damping force, which can be controlled by regulating the size of orifices 24' and by oil viscosity.

Theoretical analysis results show that the damping force of the invented isolator is greater than that of the rubber type isolators, and that dynamic characteristics have linear properties. Optimal design of the system can be readily achieved.

While the instant invention has been shown and described with specific reference to embodiments presently contemplated as the best mode of carrying out the invention in actual practice, it is to be understood that various changes may be made in adapting the invention to different embodiments without departing from the broader inventive concepts disclosed herein and comprehend by the claims which follow.

What is claimed is:

1. A vibration isolator for isolating vibrations resulting in translational displacements between concentrically spaced elements including a movable element and a stationary element, said vibration isolator comprising a chamber containing walls formed by said movable and stationary elements, a body of hydraulic fluid in said chamber, a plurality of leaf spring packs spaced about the circumference of said chamber to form circumferentially spaced hydraulic fluid compartments thereabout, said leaf spring packs containing a plurality of stacked resilient leaf spring plates having one end fixed to said stationary element and their other ends freely engaging said movable element to permit translational motion therebetween, and hydraulic fluid passage means extending between said compartments for feeding hydraulic fluid from one side of each said leaf spring pack to the other side thereof to dampen vibration between said moving elements as said movable element moves translationally relative to said stationary element.

2. A vibration isolator as recited in claim 1 in which said hydraulic fluid passage means includes an oil groove formed in said chamber walls between adjacent compartments.

3. A vibration isolator as recited in claim 1 in which said hydraulic fluid passage means comprise orifices extending through said leaf spring packs to establish fluid communication between adjacent compartments.

4. A vibration isolator as recited in claim 3 in which said one of said elements is axially movable with respect to the other said element and said leaf spring packs support said movable element.

5. A vibration isolator as recited in claim 4 in which said leaf spring packs are radially disposed between said stationary and movable elements.

6. A vibration isolator as recited in claim 1 in which said movable element includes a roller bearing element.

7. A vibration isolator as recited in claim 1 in which said movable and stationary elements are concentrically spaced rings, said leaf spring packs include leaf springs in each of which an innermost leaf spring is in sliding tangential contact with said movable element, and outer ends of said leaf springs fixedly engage said stationary element.

8. A vibration isolator as recited in claim 1 in which said hydraulic fluid passage means comprises an oil groove extending through said leaf spring packs between adjacent compartments.

* * * * *